(12) United States Patent
Adams et al.

(10) Patent No.: US 7,207,309 B2
(45) Date of Patent: Apr. 24, 2007

(54) RUNAWAY ENGINE SHUTDOWN USING COMPRESSION INHIBITING MECHANISM

(75) Inventors: Todd M. Adams, Lafayette, IN (US);
Scott M. Schwartz, Lafayette, IN (US);
John T. Allington, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/034,908

(22) Filed: Jan. 13, 2005

(65) Prior Publication Data
US 2006/0150945 A1 Jul. 13, 2006

(51) Int. Cl.
*F02D 17/04* (2006.01)
(52) U.S. Cl. .................................. 123/198 D
(58) Field of Classification Search ............ 123/198 D, 123/198 DC, 90.15, 90.12
See application file for complete search history.

(56) References Cited
U.S. PATENT DOCUMENTS 4,129,040 A 12/1978 Hayden, Jr.
6,092,495 A * 7/2000 Hackett .................... 123/90.15
6,257,194 B1 * 7/2001 Kerns et al. ............. 123/198 D
6,279,550 B1 * 8/2001 Bryant ..................... 123/559.1
6,457,466 B1 * 10/2002 Ritter et al. ................. 123/676

* cited by examiner

*Primary Examiner*—Stephen K. Cronin
*Assistant Examiner*—Hyder Ali
(74) *Attorney, Agent, or Firm*—Liell & McNeil

(57) ABSTRACT

An engine that is operating with a combustible intake mixture may begin in to runaway, or in other words, uncontrollably operate at excessive speeds. In order to shutdown a runaway engine, the present disclosure determines whether an engine is operating in a runaway condition. If the engine is operating in the runaway condition, a compression inhibiting mechanism is moved from a first position in which compression ignition can occur within at least one combustion chamber and a second position in which compression ignition cannot occur within the at least one combustion chamber.

20 Claims, 2 Drawing Sheets

RUNAWAY ENGINE SHUTDOWN USING COMPRESSION INHIBITING MECHANISM

TECHNICAL FIELD

The present disclosure relates generally to compression inhibiting mechanisms, and more particularly, to using a compression inhibiting mechanism to shut down a runaway engine.

BACKGROUND

A diesel engine operating with a combustible intake mixture can result in a runaway engine. Those skilled in the art will appreciate that a runaway engine is an engine operating at uncontrollable speeds, causing a potentially dangerous situation. For instance, a combustible environment can be created when a drilling rig accidentally punctures a pocket of natural gas. The gas leaking from the line can mix with the ambient air used by a diesel engine powering the drilling rig. Thus, the engine drawing in the air, which is mixed with fuel (natural gas) and then initially mixed with more fuel, potentially leading to the runaway engine, even when the normal fuel supply to the engine is terminated. In other words, the concentration of gaseous fuel in the vicinity of the engine intake may be high enough for compression ignition to occur, and may be so rich that the engine speed increases out of control. Other fuel sources internal to the engine such as oil leaking past the turbocharger might also cause a runaway condition.

In order to protect workers from a runaway engine situation, some diesel engines in these environs often include engine shutdown features. One known engine shutdown feature is an air intake shutdown mechanism that operates to shut off the air supply passage to the combustion chambers of the engine when the engine is in the runaway condition. The air intake shutdown mechanism generally includes a member that, when in a first position, does not interfere with an air intake passage, and when in a second position, blocks the air intake passage leading to each combustion chamber. When an electronic control module determines that the engine is in the runaway condition, the member will be moved from the first to the second position, blocking the air intake passage, thereby inhibiting combustion within the combustion chamber and stopping the engine. Manual intake passage closure might also be available.

Although the air intake shutdown mechanism can slow, and usually stop, the runaway engine, there is room for improvement. The air intake shutdown mechanism requires additional hardware that increases the cost of the engine. Further, it is known that the less components an engine has, the more robust the engine. In other words, air intake shut down mechanisms can fail with potentially catastrophic consequences.

The present disclosure is directed at overcoming one or more of the problems set forth above.

SUMMARY OF THE INVENTION

In one aspect of the present disclosure, an engine includes at least one combustion chamber defined by a cylinder and a piston that is operable to reciprocate within the cylinder. A compression inhibiting mechanism is moveable between a first position in which compression ignition can occur within the combustion chamber and a second position in which compression ignition cannot occur within the combustion chamber. The compression inhibiting mechanism is in communication with an electronic control module that includes an engine shut down algorithm operable to move the compression inhibiting mechanism from the first position to the second position when the engine is operating in a runaway condition.

In another aspect of the present disclosure, an article includes a computer readable data storage medium with an engine shutdown algorithm. The engine shutdown algorithm is operable to signal a compression inhibiting mechanism to inhibit compression ignition within at least one combustion chamber when an engine is in a runaway condition.

In yet another aspect of the present disclosure, an engine is shut down by determining whether the engine is operating in a runaway condition.

When the engine is operating in the runaway condition, a compression inhibiting mechanism is moved from a first position in which compression ignition can occur within at least one combustion chamber to a second position in which compression ignition cannot occur within the at least one combustion chamber.

DETAILED DESCRIPTION

Figure 1:
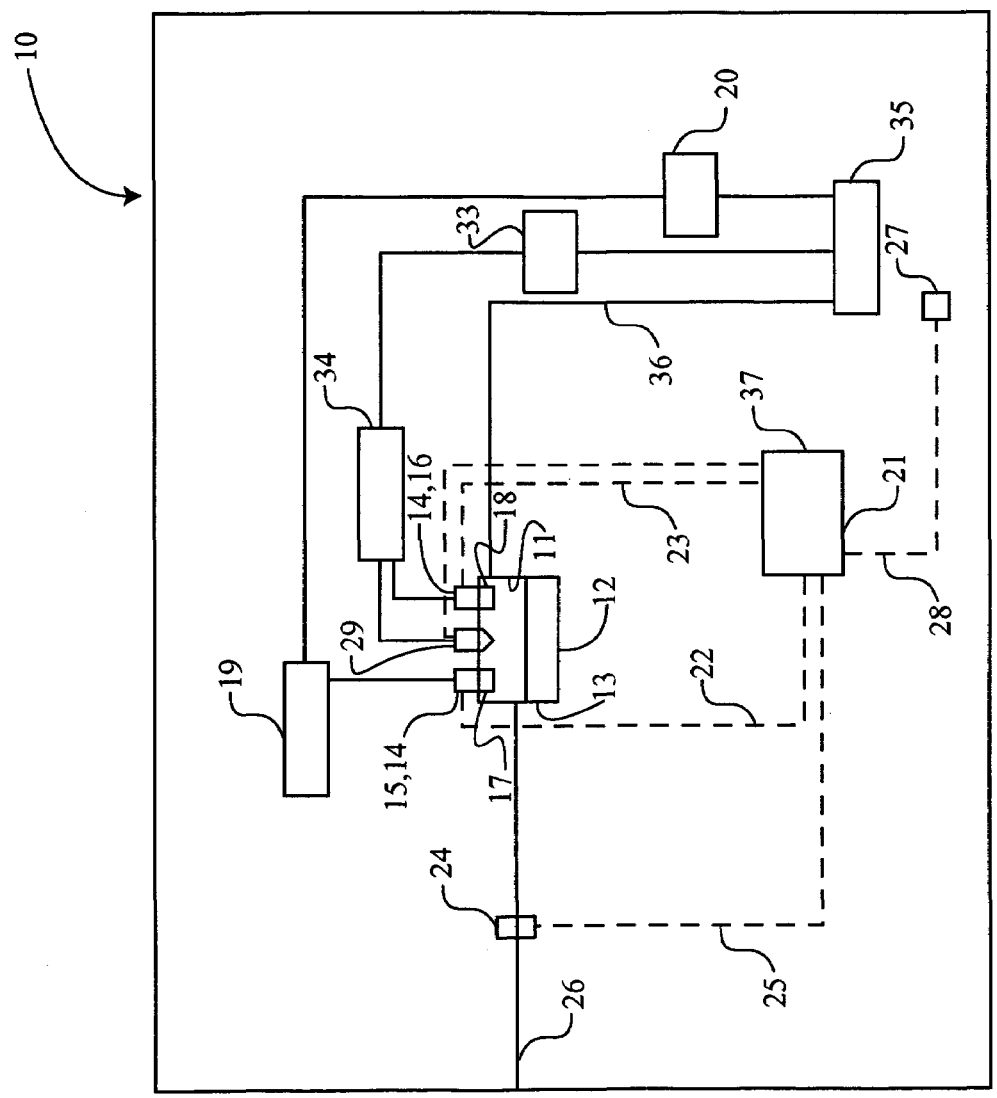
FIG. 1 is a schematic representation of an engine, according to the present disclosure.

Referring to FIG. 1, there is shown a schematic representation of a internal combustion engine 10, according to the present disclosure. Engine may likely be a compression ignition engine, but could be spark ignited or otherwise ignited, but has a potential to support compression ignition under some circumstances, such as operation in a combustible environment. The engine 10 includes at least one combustion chamber 11 defined by a cylinder 12 and a piston 13 that is operable to reciprocate within the cylinder 12. Although only one combustion chamber 11 is shown, it should be appreciated that the present disclosure contemplates the engine 10 including any number of cylinders, each defining a combustion chamber. The present disclosure will operate similarly for each combustion chamber. A compression inhibiting mechanism 14 is associated within each combustion chamber 11. The compression inhibiting mechanism 14 is moveable between a first position in which combustion ignition can occur (as shown) and a second position in which combustion ignition cannot occur. The compression inhibiting mechanism 14 preferably includes at least one variable gas exchange valve actuator coupled to a gas exchange valve positioned within the cylinder 12. The gas exchange valve might be cam-actuated, and if so, it would inherently include a cam-dictated valve closing timing. In other words, the gas exchange valve is generally opened and closed at regular predetermined timings via a cam operably coupled to a rocker arm in a conventional manner. Nevertheless, the present disclosure contemplates non-cam actuated gas exchange valves, such as those that might be purely electronically controlled and actuated via hydraulic pressure at selected timings.

In the illustrated embodiment, the compression inhibiting mechanism 14 includes two gas exchange valve actuators 15 and 16, each coupled to a respective gas exchange valve 17 and 18 associated with combustion chamber 11. Specially, a variable timing intake valve actuator 15 and a variable timing exhaust valve actuator 16 are coupled to an intake valve 17 and an exhaust valve 18, respectively. Those skilled in the art will appreciate that the intake valve actuator 15 is generally used to retard the closing of the intake valve 17 beyond the cam-dictated closing timing in order to vary the volumetric efficiency within the combustion chamber 11, and the exhaust valve actuator 16 is generally used to open the exhaust valve at or near the top dead center of the compression stroke in order to perform engine braking. The exhaust valve actuator 16 is often referred to in the art as an engine brake. Although the present disclosure contemplates a variable intake valve actuator that has the capability of opening the intake valve at anytime during the engine cycle, the illustrated intake valve actuator 15 is unable to open the intake valve 17. Rather, the cam opens the intake valve 17 at the predetermined cam-dictated opening timing, and the valve actuator 15 can hold the intake valve 17 open beyond the cam-dictated closing timing. The exhaust valve actuator 16 is sufficiently powerful to open the exhaust valve 18 at virtually any timing during the engine operation. Thus, the present disclosure contemplates engines equipped with intake and exhaust valve actuators with differing capabilities, as long as the actuators are electronically controlled.

Although both the variable timing intake valve actuator 15 and the variable timing exhaust valve actuator 16 are used as the compression inhibiting mechanism 14 in the illustrated engine 10, it should be appreciated that the compression inhibiting mechanism 14 could include either the variable timing intake valve actuator 15 or the variable timing exhaust valve actuator 16. In fact, in engines with multiple combustion chambers, the compression inhibiting mechanisms of some of the chambers could use the intake valve actuator while the others could use the exhaust valve actuator. Moreover, the present disclosure contemplates engines in which less than all, and possibly only one, of the exhaust valves or intake valves have some variable valve timing capability. Alternatively, the present disclosure contemplates a single valve actuator controlling the flow of hydraulic fluid to and from the intake and/or exhaust valve for each combustion chamber. Although the single valve actuator would not provide variable valve capabilities during the operation of the engine the valve actuator can be used to inhibit compression ignition when the engine is in a runaway condition.

In the illustrated embodiment, both the variable intake valve actuator 15 and the variable exhaust valve actuator 16 are electro-hydraulically controlled. Each valve actuator 15 and 16 includes an electrically-actuated flow control valve that controls the flow of hydraulic fluid to and from the actuators 15 and 16, respectively. Other actuating strategies, such as electro magnetic, pneumatic, or otherwise could be employed without departing from the scope of this disclosure. The valve actuators 15 and 17 include hydraulically actuated pistons that are exposed to the hydraulic pressure, and are moveable between a biased first position and a second position. The intake and exhaust valves 17 and 18 are coupled to move with the pistons of the respective actuators 15 and 16, respectively. The intake valve actuator 15 is in fluid communication with a low pressure common rail 19, and the exhaust valve actuator 16 is in fluid communication with a high pressure common rail 34. In the illustrated embodiment, hydraulic fluid is supplied to the low pressure common rail 19 and the high pressure common rail 34 from a hydraulic fluid reservoir 35 via a low pressure pump 20 and a high pressure pump 33, respectively. The exhaust valve actuator 16 is also fluidly connected to the hydraulic fluid reservoir 35 via a drain line 36. The engine 10 and its sub systems, including the intake valve actuator 15 and the exhaust valve actuator 16 are controlled in a conventional manner via an article 37 including an electronic control module 21 via communication lines 22 and 23, respectively. The electronic control module 21 is also in communication with a fuel injector 29 operable to inject fuel within the combustion chamber 11, and at least one engine runaway sensor 27 via a sensor communication line 28. In the illustrated example, the engine runaway sensor 27 might be a conventional speed sensor, known in the art.

Those skilled in the art will appreciate that compression occurs during the compression stroke of an engine cycle, and compression ignition generally occurs near top dead center of the compression stroke. When the variable intake valve actuator 15 and the exhaust valve actuator 16 are in the first position during a substantial portion of the compression stroke, the opening and closing of the intake valve 17 and the exhaust valve 18 are controlled by the rotation of the cam in a conventional manner. Thus, during a substantial portion, if not all, of the compression stroke, both the intake valve 17 and the exhaust valve 18 will be closed by the rotation of the cam, and compression ignition can occur within the combustion chamber 11. Specifically, when the intake valve actuator 15 is in the first position, the flow control valve of the valve actuator 15 is open, allowing hydraulic fluid to flow to and from the hydraulic surface of the piston. The hydraulic fluid acting on the surface will cause the piston to move downward during the intake stroke, following the downward movement of the intake valve 17 coupled to the cam. When the rotation of the cam causes the intake valve 17 to move upward to the closed position during the compression stroke, the end of the rocker arm coupled to the valve 17 will contact the piston of the actuator 15, moving the piston upward to the first position. The hydraulic fluid acting on the hydraulic surface of the piston will be pushed back to the common rail 19 through the open intake flow control valve of the actuator 15. When the exhaust valve actuator 16 is in the first position, the flow control valve of the exhaust valve actuator 16 is in a first position fluidly connecting the actuator 16 to the low pressure drain 36. The low pressure acting on the piston is insufficient to open the exhaust valve 18 against the pressure within the combustion chamber 11.

When either the variable intake valve actuator 15 or the variable exhaust valve actuator 16 is in the second position during a substantial portion of the compression stroke, the respective valve 17 and/or 18 will be open, and compression ignition cannot occur within the combustion chamber 11. Since gas in the cylinder is merely displaced into one or both of the intake and exhaust passages such that no substantial pressure rise associated with compression ignition can occur. It should be appreciated that the present disclosure contemplates compression ignition being inhibited by opening only one of the valves 17 or 18, or both valves 17 and 18. In order to move the intake valve actuator 15 to the second position, near the end of the intake stroke, the electrically actuated flow control valve of the intake valve actuator 15 is moved to a closed position. The closed flow control valve of the actuator 15 blocks the flow of hydraulic fluid from the hydraulic surface of the piston back to the low pressure common rail. The isolated hydraulic fluid locks the piston in the second position. As the intake valve 17 moves upward due to the rotation of the cam during the compression stroke, the rocker arm will contact the stationary piston and decouple from the cam. Thus, the cam cannot move the intake valve 17 to the closed position. The hydraulically locked piston of the actuator 15 is in the second position and will hold the intake valve 17 in a partially open position, such as 20% of the total lift, preventing compression ignition. In order to move the piston back to the first position, the flow control valve can be opened, allowing the release of the hydraulic fluid back to the common rail and the piston to return to the first position. In order to move the exhaust valve actuator 16 to the second position, the flow control valve of the exhaust valve actuator 16 is moved to the second position fluidly connecting the actuator 16 to the high pressure common rail 34. The relatively high pressure acting on the piston will cause the piston and the exhaust valve 17 coupled to the piston to move downward to the open position, preventing compression ignition.

The engine 10 also might include an air intake shutdown mechanism 24 positioned within an air supply line 26 connecting the combustion chamber 11 to a source of air. The air intake shutdown mechanism 24 is moveable between a first position in which the air supply line 26 to the combustion chamber 11 is open and a second position in which the air supply line 26 to the combustion chamber 11 is blocked. The air intake shutdown mechanism 24 is in communication with the electronic control module 21 via an air intake shutdown communication line 25.

Figure 2:
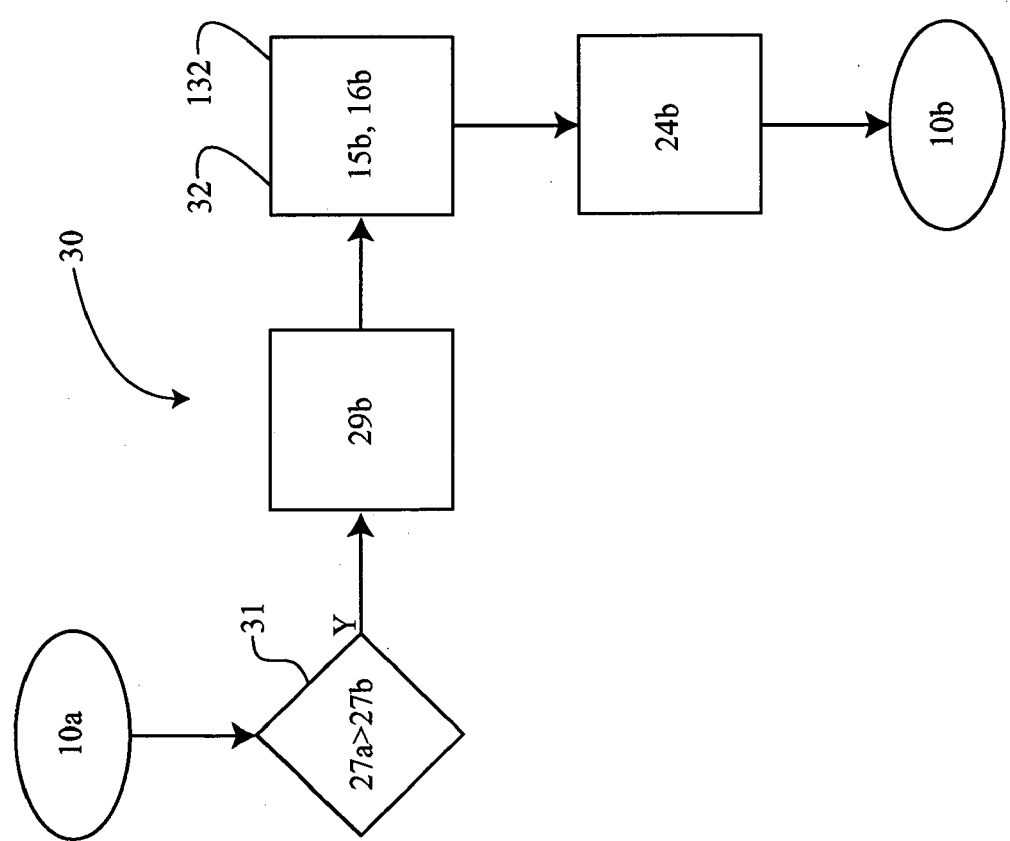
FIG. 2 is a software flow diagram illustrating an engine shutdown algorithm, according to the present disclosure.

Referring to FIG. 2, there is shown a flow chart illustrating an engine shutdown algorithm 30 included within the electronic control module 21 of FIG. 1. The engine shut down algorithm 30 is operable to move the compression inhibiting mechanism 14 from the first position to the second position when the engine 10 is operating in a runaway condition. Preferably, the engine shutdown algorithm 30 is also operable to move the air intake shutdown mechanism 24 from the first position 24a to the second position 24b when the engine 10 is operating in the runaway condition. Those skilled in the art will appreciate that the engine 10 is operating in the runaway condition when the engine 10 is operating at uncontrollable high speed generally due to a combustible environment.

The engine shutdown algorithm 30 is activated upon start-up 10a of the engine 10. The engine shutdown algorithm 30 includes a determination algorithm 31 operable to determine whether the engine 10 is operating in the runaway condition. In the illustrated example, the determination algorithm 31 determines whether a sensed engine speed 27a communicated from the engine speed sensor 27 is equal to a predetermined engine speed 27b. The predetermined speed 27b is a speed slightly greater than a maximum allowable speed, sometimes referred to as a maximum rated speed, at which the engine 10 is designed to operate. In the illustrated embodiment, the predetermined engine speed 27b is approximately 14–17% over the maximum allowable speed. However, it should be appreciated that the predetermined engine speed could be any engine speed over which it is undesirable for the engine to operate. If the sensed engine speed 27a is greater than the predetermined engine speed 27b, the electronic control module 21 will acknowledge these conditions as indicating engine run away and will signal the fuel injector 29 to cease fuel injection 29b into the combustion chamber 11. The engine shutdown algorithm 30 will also signal the intake valve actuator 15 and the exhaust valve actuator 16 to move from the first position 15a, 16a to the second position 15b, 16b. If the engine speed 27a is still greater than the desired engine speed 27b, the engine shutdown algorithm 30 may also signal the air intake shutdown mechanism 24 to move from the first position 24a to the second position 24b, thereby blocking the air supply 26 to the combustion chamber 11.

A timing algorithm 32 of the engine shutdown algorithm 30 will signal the variable intake valve actuator 15 and the variable exhaust valve actuator 16 to move to the second position 15b, 16b for a predetermined portion of the compression stroke of each engine cycle, or possibly remain open for the entire engine cycle, assuming that adequate actuation power is available. The predetermined portion is any portion of the compression stroke able to prevent sufficient compression for compression ignition. Thus, the predetermined portion is at least a substantial portion, if not all, of each compression stroke. The intake valve 17 and the exhaust valve 18 will be open for at least a substantial portion of each compression stroke, thus inhibiting compression ignition within the combustion chamber 11. Because compression ignition is being inhibited, the engine 10 should eventually shut-down 10b and coast to a stop. Alternatively, the engine shut down algorithm 30 can include a timing algorithm 132 that is operable to signal the variable intake valve actuator 15 and the variable exhaust valve actuator 16 to move to the second position 15b, 16b until the engine 10 is shutdown. Thus, the valve actuators 15 and 16 will be in the second position for the entire engine cycle. Holding the variable intake valve actuator 15 and the variable exhaust valve actuator 16 in the second position 15b, 16b until the engine 10 is shutdown can assure that any combustion which may occur of diesel deposits on the piston 13 can be vented rather than used to power the engine 10. However, allowing the valve actuators 15, 16 to close during the power stroke may create a vacuum that can add in slowing the engine. Thus, the present disclosure contemplates both timing algorithms 32, 132.

INDUSTRIAL APPLICABILITY

Referring to FIGS. 1–2, the operation of the present disclosure will be discussed for combustion chamber 11 within engine 10. However, it should be appreciated that the present disclosure will operate similarly within each combustion chamber of an engine having any number of combustion chambers. Although the compression inhibiting mechanism 14 might include both the variable intake valve actuator 15 and the variable exhaust valve actuator 16, the present disclosure contemplates the compression inhibiting mechanism including only the variable exhaust valve actuator or the variable intake valve actuator. Moreover, although both the exhaust valve 18 and the intake valve 17 are generally cam-actuated, the present disclosure contemplates use with exhaust valves and intake valves that are camless and electrically controlled.

In order to shut down the engine 10, it is determined whether the engine 10 is operating in the runaway condition. Although the engine shutdown algorithm 30 within the electronic control module 21 preferably determines whether the engine 10 is in the runaway condition, the present disclosure contemplates other methods of determining if the engine 10 is in the runaway condition, such as observation by an operator. For instance, if the operator observes that the engine 10 is operating uncontrollably or in a combustible environment, the operator can pull a lever coupled to the electronic control module 21 in order to activate the engine shutdown algorithm. In the preferred embodiment, after start-up 10a, the engine runaway sensor 27 will periodically sense and communicate to the electronic control module 21 the speed 27a of the engine 10. It should be appreciated that many engines already include engine speed sensors and logic to monitor and maintain the desired engine speed. If the sensed engine speed 27a is greater than the predetermined engine speed 27b, or if engine speed is increasing when not commanded to do so, the determining algorithm 31 of the engine shutdown algorithm 30 determines that the engine 10 is in the runaway condition.

When the engine is in the runaway condition, compression ignition is inhibited by moving the compression inhibiting mechanism 14 from the first position to the second position. Preferably, the engine shutdown algorithm 30 signals both the variable timing valve actuators 15 and 16 to move from the first position 15a, 16a in which compression ignition can occur to the second position 15b, 16b in which compression ignition cannot occur within the combustion chamber 11. Specifically, the intake valve 17 will open at the regular predetermined cam-opening timing during the intake stroke of the engine cycle. However, rather than allowing the rotation of the cam to close the intake valve 17 during the compression stroke at the regular cam-dictated closing timing, the intake valve 17 is held open for at least the substantial portion of the compression stroke via the intake valve actuator 15. Near the end of the intake stroke, the engine shutdown algorithm 30 will signal the intake valve actuator 15 to move to the second position 15b. In order to move the piston of the actuator 15 to the second position 15b, the electronic control module 21 signals the flow control valve to close, blocking the flow of hydraulic fluid back to the low pressure common rail 19. The fluid isolated above the piston of the actuator 15 coupled to the valve 17 will hold the intake valve 17 open despite the rotation of the cam. It should be appreciated, depending on the design of the intake valve actuator 15, the intake valve 17 can be held open at any position between a fully open position and a closed position. Those skilled in the art appreciate that the intake valve 17 should be held open at a position that prevents combustion ignition, but avoids the possibility of valve 17-piston 13 collision. In the illustrated embodiment, the intake valve 17 is held open at a partially open position, such as 20% of the total lift, by the intake valve actuator 15. It should also be appreciated that the timing algorithm 32 of the engine shutdown algorithm 30 will hold the intake valve 17 open until the end of each compression stroke. Alternatively, the timing algorithm 132 will hold the intake valve 17 open until the engine 10 is shutdown. Thus, the valve 17 will be held open during the entire engine cycle. Either way, compression ignition will be inhibited during the compression stroke even in a combustible environment. In order to return the actuator piston, and thus, the intake valve actuator 15, to the first position, the electronic control module 21 can signal the flow control valve of the actuator 15 to open and allow the flow of hydraulic fluid back to the common rail 19. The process can repeat for each engine cycle until the engine 10 is shutdown 10b.

In order to move the exhaust valve actuator 16 to the second position 16b during at least a substantial portion of the compression stroke, the electronic control module 21 signals the flow control valve of the actuator 16 to move to the second position in which the high pressure common rail 34 is fluidly connected to the exhaust valve actuator 16. The high pressure acting on the piston of the actuator 16 will cause the piston to advance to the second position 16b. The exhaust valve 18 will move with the piston to an open position against the pressure within the combustion chamber 11. In other words, the engine brake is activated during a substantial portion, or even all, of the compression stroke. Because the exhaust valve 18 is open, compression ignition cannot occur. Similar to the actuating of the intake valve actuator 15, the exhaust valve actuator 16 will be actuated slightly before or during the compression stroke of each engine cycle, and will be held open until the end of each compression stroke or during the entire engine cycle until the engine 10 is shut down 10b. It should be appreciated that the exhaust valve 18 will be opened earlier in the compression stroke by the engine shutdown algorithm 30 than the exhaust valve 18 would be open during engine braking. In order to move the exhaust valve actuator 16 back to the first position 16a, the flow control valve will be moved back to the first position fluidly connecting the actuator 16 to the low pressure drain 36, allowing the piston to retract. Those skilled in the art will appreciate that although the exhaust valve actuator is indicated as being part of an engine brake, those skilled in the art will appreciate that it might in the alternative be similar to the variable intake valve actuator in that it merely has the ability to open the valve or maintain the same open outside of the cam dictated closing timings.

Moreover, when the engine shutdown algorithm 30 determines that the engine 10 is in the runaway condition, the engine shutdown algorithm 30 preferably also signals the air intake shutdown device 25 to move from the first position 25a in which the air supply line 26 to the compression chamber 11 is open to the second position 25b in which the air supply line 26 to the compression chamber 11 is closed. Thus, when the intake valve 17 is in the open position during the intake stroke, there will be limited, if any, air being drawn into the combustion chamber 11. Without the air supply, significant combustion cannot occur, providing an added assurance that the runaway engine will shut down.

The present disclosure is advantageous because it provides a relatively inexpensive method of shutting down a runaway engine using existing hardware, being the intake valve actuator 15 and the engine valve actuator 16 for each combustion chamber 11. By holding the intake valve 17 or the exhaust valve 18 open using software commands, via the intake valve actuator 15 and the variable exhaust valve actuator 16, for each compression stroke, and possibly the entire engine cycle, compression ignition cannot occur within the combustion chamber 11 despite the combustible environment. Because many engines already include variable intake valve actuators to vary the volumetric efficiency of the combustion chambers and exhaust valve actuators as engine brakes, no additional hardware will be needed. Because the compression inhibiting mechanism 14 of the present disclosure requires no additional hardware, the present disclosure is relatively inexpensive to implement via added software. The improved reliability of the engine shut down method 30 increases the certainty that the engine can be shutdown when the need arises.

Further, those skilled in the art will appreciate that the present disclosure can be used, along with other methods, to shutdown a runaway engine. For instance, the engine 10 may include both the compression inhibiting mechanism 14 and the air intake shutdown mechanism 25. When the electronic control module 21 determines that the engine 10 is in the runaway condition, the compression inhibiting mechanism 14 can hold open the intake valve 17 and/or exhaust valve 18 and also block the air supply line 26 to inhibit combustion. By including two engine shut down mechanisms, any risk that the engine shutdown algorithm will fail to shutdown the runaway engine 10 is greatly reduced, if not eliminated. Nevertheless, those skilled in the art will appreciate that the illustrated shutdown strategy can be implemented as a substitute for the formally known air intake shutdown mechanisms previously in use.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. An engine comprising:
   at least one combustion chamber defined by a cylinder and a piston operable to reciprocate within the cylinder;
   a compression inhibiting mechanism, which includes an electro-hydraulically controlled actuator, being moveable between a first position in which compression ignition can occur within the combustion chamber and a second position in which compression ignition cannot occur within the combustion chamber; and
   an electronic control module being in communication with the compression inhibiting mechanism and including an engine shut down algorithm being operable to move the compression inhibiting mechanism from the first position to the second position when the engine is operating in a runaway condition.

2. The engine of claim 1 wherein the electronic control module being in communication with at least one engine runaway sensor.

3. The engine of claim 1 wherein the compression inhibiting mechanism includes at least one variable gas exchange valve actuator associated with each of the at least one combustion chambers.

4. The engine of claim 3 wherein the variable gas exchange valve actuator being coupled to a gas exchange valve; and
   the gas exchange valve having a cam-dictated valve closing timing.

5. The engine of claim 3 wherein the at least one gas exchange valve actuator includes a variable intake valve actuator associated with each of the at least one combustion chambers.

6. The engine of claim 3 wherein the at least one gas exchange valve actuator includes a variable exhaust valve actuator associated with each of the at least one combustion chambers.

7. The engine of claim 1 including an air intake shutdown mechanism being moveable between a first position in which an air supply to the at least one the combustion chamber is open and a second position in which the air supply to the at least one combustion chamber is blocked; and
   the electronic control module being in communication with the air intake shutdown device and the engine shutdown algorithm being operable to move the air intake shutdown mechanism from the first position to the second position when the engine is operating in the runaway condition.

8. The engine of claim 7 wherein the electronic control module being in communication with at least one engine runaway sensor; and
   the compression inhibiting mechanism includes at least one variable gas exchange valve actuator associated with each of the at least one combustion chambers and being coupled to a gas exchange valve with a cam-dictated closing timing.

9. An article comprising:
   a computer readable data storage medium including an engine shutdown algorithm; and
   the engine shutdown algorithm being operable to signal at least one compression inhibiting mechanism, which includes an electro-hydraulically controlled actuator, to inhibit compression ignition within at least one combustion chamber when the engine is in a runaway condition.

10. The article of claim 9 wherein the computer readable data storage medium being included within an electronic control module.

11. The article of claim 9 wherein the compression inhibiting mechanism includes at least one variable gas exchange valve actuator associated with each of the at least one combustion chambers.

12. The article of claim 11 wherein the at least one variable gas exchange valve actuator includes a variable intake valve actuator associated with each of the at least one combustion chambers.

13. The article of claim 11 wherein the at least one variable gas exchange valve includes a variable exhaust valve actuator associated with each of the at least one combustion chambers.

14. The article of claim 9 wherein the engine shutdown algorithm includes a timing algorithm being operable to signal the compression inhibiting mechanism to remain in the second position for a predetermined portion of a compression stroke of each engine cycle.

15. The article of claim 9 wherein the engine shutdown algorithm includes a timing algorithm being operable to signal the compression inhibiting mechanism to remain in the second position until the engine is shutdown.

16. The article of claim 15 wherein the computer readable data storage medium article being included within an electronic control module;
   the compression inhibiting mechanism includes at least one variable gas exchange valve actuator associated with each of the at least one combustion chambers and being coupled to a gas exchange valve with a cam-dictated closing timing.

17. A method of shutting down an engine, comprising the steps of:
   determining whether the engine is operating in a runaway condition;
   moving a compression inhibiting mechanism, when the engine is operating in the runaway condition, from a first position in which compression ignition can occur within at least one combustion chamber to a second position in which compression ignition cannot occur within the at least one combustion chamber;
   the moving step includes pushing a hydraulically actuated piston with hydraulic fluid via an electrically-actuated flow control valve.

18. The method of claim 17 wherein the step of moving includes the steps of opening an intake valve associated with each of the at least one combustion chambers via a cam, and holding open the intake valve via an intake valve actuator for at least a substantial portion of the compression stroke.

19. The method of claim 18 wherein the step of moving includes a step of activating an engine brake associated with each of the at least one combustion chambers for, at least, a substantial portion of a compression stroke.

20. The method of claim 17 wherein the step of moving includes a step of activating an engine brake associated with each of the at least one combustion chambers for, at least, a substantial portion of a compression stroke.

* * * * *